(12) United States Patent
van Walraven

(10) Patent No.: US 6,282,756 B1
(45) Date of Patent: Sep. 4, 2001

(54) PIPE CLIP

(75) Inventor: Jan van Walraven, Mijdrecht (NL)

(73) Assignee: J. Van Walraven B.V. (NL)

( * ) Notice: Subject to any disclaimer, the term of this patent is extended or adjusted under 35 U.S.C. 154(b) by 0 days.

(21) Appl. No.: 09/497,940

(22) Filed: Feb. 4, 2000

Related U.S. Application Data

(63) Continuation of application No. PCT/NL98/00436, filed on Jul. 30, 1998.

(30) Foreign Application Priority Data

Aug. 5, 1997 (NE) .................................................. 1006726

(51) Int. Cl.$^7$ ................................. F16L 3/10; F16L 55/33
(52) U.S. Cl. ................................ 24/19; 24/279; 248/74.1
(58) Field of Search ................................ 24/19, 20 R, 21, 24/24, 279, 280, 282; 285/61, 64; 248/62, 63

(56) References Cited

U.S. PATENT DOCUMENTS

| | | | |
|---|---|---|---|
| 2,616,645 | * | 11/1952 | Kindorf et al. ........................ 248/62 |
| 3,167,286 | * | 1/1965 | Sherburne .............................. 248/62 |
| 3,265,340 | * | 8/1966 | Attwood ................................. 248/62 |
| 3,526,381 | * | 9/1970 | Pepe ..................................... 248/74.1 |
| 4,467,988 | * | 8/1984 | Kraus ............................... 248/74.1 X |
| 4,489,908 | * | 12/1984 | Rumble ................................ 248/62 |
| 5,327,618 | * | 7/1994 | Chene et al. ......................... 24/19 X |
| 5,568,906 | * | 10/1996 | Hahn et al. ......................... 248/74.1 |
| 5,746,401 | * | 5/1998 | Condon ................................ 248/62 |

FOREIGN PATENT DOCUMENTS

| | | | |
|---|---|---|---|
| 4213893 A1 | * | 11/1993 | (DE) . |
| 9309869.3 U1 | * | 12/1994 | (DE) . |
| 0667475 A1 | * | 8/1995 | (EP) . |
| 0769647 A1 | * | 4/1997 | (EP) . |
| 1031573 | * | 6/1966 | (GB) . |

OTHER PUBLICATIONS

PCT Novelty Search Report with English Translation.
Int'l Search Report.

* cited by examiner

Primary Examiner—Robert J. Sandy
(74) Attorney, Agent, or Firm—Todd Deveau; Ryan A. Schneider; Troutman Sanders LLP

(57) ABSTRACT

A pipe clip comprising an annular clip body which is made from metal and has adjacent clip-body ends which, between them, form an opening for positioning a pipe around which the pipe clip is to be placed and which can be joined together, which pipe clip furthermore comprises a female fastening element which is fixed to the metal clip body and has an axial bore provided with an internal screw thread for a male fastening element which is provided with an external screw thread and connects the pipe clip to a wall, ceiling or other support.

The female fastening element comprises a plurality of segments which are disposed around the axial bore and each have one or more internal screw-thread parts which together form the internal screw thread of the female fastening element, at least one of the segments being moveable between a radially outer position, in which the male fastening element can be inserted into the female fastening element in the direction of the clip body without a screwing movement of the female fastening element with respect to the male fastening element, and a radially inner position, in which the screw-thread parts are in engagement with the external screw thread of the male fastening element.

19 Claims, 3 Drawing Sheets

PIPE CLIP

CROSS-REFERENCE TO RELATED APPLICATIONS

This is a continuation application of PCT/NL98/00436 filed Jul. 30, 1998.

FIELD OF THE INVENTION

The present invention relates to a pipe clip comprising an annular clip body which is made from metal and has at least one opening which is delimited by two adjacent clip-body ends, in order to position the clip body around a pipe, and means for joining together the clip-body ends when the pipe clip is lying around the pipe, the pipe clip furthermore comprising a female fastening element, which is fixed to the metal clip body and has an axial bore provided with an internal screw thread for a male fastening element which is provided with an external screw thread and connects the pipe clip to a wall, ceiling or similar support.

BACKGROUND OF THE INVENTION

Metal pipe clips have already been in production for a number of decades as a mass-produced product and are used for attaching pipes to walls, ceilings or other supports. An example of a pipe clip of this nature is shown in EP 0 387 966. As is known, there are pipe clips in which the clip body comprises two halves which can be joined together and pipe clips in which the clip body is formed by a single part and can be bent in order to place the pipe in the pipe clip and then bent back in order to surround the pipe. The present invention relates, inter alia, to both types of pipe clips.

The male fastening element between the pipe clip, on the one hand, and wall, ceiling or similar support, on the other hand, is usually a threaded rod or a threaded bolt with a metric screw thread or a special threaded bolt with a wood screw thread at one end and a metric screw thread at the other end. The screw thread diameter is usually M8 or M10. The female fastening element is usually a solid hexagonal metal nut with an axial bore which is provided with an internal screw thread which is adapted to the male fastening element, which nut is welded fixedly to the clip body. A nut with a stepped bore is also known as a female fastening element, part of the bore having an internal screw thread of size M8 and another part having an internal screw thread of size M10. The axial bore of the female fastening element is directed towards the centre of the pipe clip.

Over the course of recent decades, a very large number of designs of metal pipe clips of this nature have been developed, the aim in each case being to fit and fix the pipe in the pipe clip rapidly, easily and reliably. These developments related in particular to the connecting means which join the clip-body ends, which connection is brought about after the pipe has been placed in the pipe clip. Known connecting means are, for example, hooks or a tightening screw.

OBJECT OF THE INVENTION

The object of the present invention is to propose measures which accelerate and facilitate the actions which the fitter has to carry out to install the metal pipe clips and pipes still further.

SUMMARY OF THE INVENTION

The present invention provides a metal pipe clip comprising an annular clip body which is made from metal and has at least one opening which is delimited by two adjacent clip-body ends, in order to position the clip body around a pipe, and means for joining together the clip-body ends when the pipe clip is lying around the pipe, the pipe clip furthermore comprising a female fastening element, which is fixed to the metal clip body and has an axial bore provided with an internal screw thread for a male fastening element which is provided with an external screw thread and connects the pipe clip to a wall, ceiling or similar support.

The pipe clip is characterized in that the female fastening element comprises a plurality of segments which are disposed around the axial bore and each have one or more internal screw-thread parts which together form the internal screw thread of the female fastening element, at least one of the segments being moveable between a radially outer position, in which the male fastening element can be inserted into the female fastening element in the direction of the clip body without a screwing movement of the female fastening element with respect to the male fastening element, and a radially inner position, in which the screw-thread parts are in engagement with the external screw thread of the male fastening element.

The invention therefore provides for the replacement of the known solid nut which is welded to the clip body by a female fastening element which makes it possible to place the pipe clip on the male fastening element without the pipe clip having to rotate with respect to the male fastening element.

In a preferred embodiment, the internal screw-thread parts can move in such a manner that they move towards the radially outer position when the male fastening element is inserted into the female fastening element in the direction of the clip body. In order to place this pipe clip on the male fastening element, the pipe clip can be held in one hand and can be pressed on the male fastening element with the same hand, so that there is no tool required. If the fitter is standing on a ladder, he can use the other hand to hold on. Furthermore, it is preferable for the internal screw-thread parts to remain in engagement with the male fastening element of their own accord under a load which seeks to move the male fastening element out of the female fastening element, in particular the load exerted by the pipe on the pipe clip. This means that the female fastening element is preferably designed in such a way that after the pipe clip has been placed on the male fastening element without rotation there is no need for any additional action in order to lock the pipe clip on the male fastening element.

Preferably, the female fastening element is designed in such a way that a pipe clip which has been placed on the male fastening element, can only be unscrewed from the male fastening element, which is not often necessary, by rotating the pipe clip with respect to the male fastening element.

Further advantageous embodiments of the pipe clip according to the invention are described in the claims and the following description given with reference to the drawing.

DETAILED DESCRIPTION OF PREFERRED EMBODIMENTS

Figure 1:
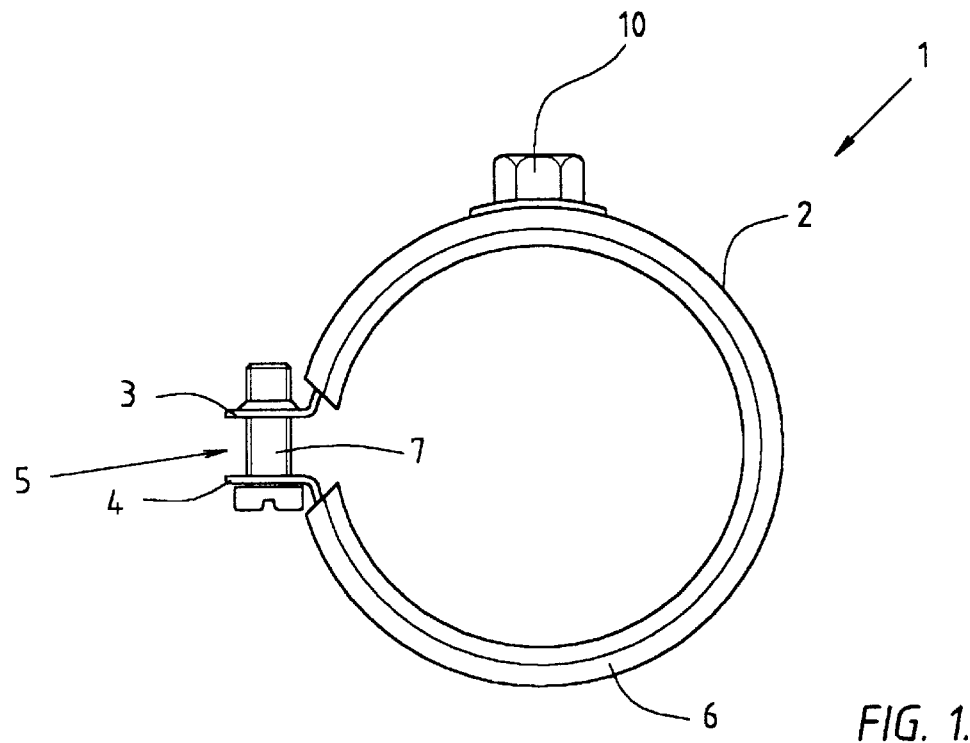
FIG. 1 diagrammatically shows a side view of a first exemplary embodiment of the pipe clip according to the invention.

FIG. 1 shows a pipe clip 1 for attaching a pipe to a wall, ceiling or other support. The pipe clip 1 comprises an annular, single-part clip body 2 made from metal, in particular from a steel strip, which clip body is substantially dimensionally stable and has two adjacent clip-body ends 3, 4, which between them form a passage opening 5 for a pipe (not shown) which is to be surrounded by the pipe clip 1. The inner side of the clip body 2 is lined, in a manner which is known per se, with a plastic or rubber lining 6.

In this case, the clip-body ends 3, 4 are designed as flanges which are directed radially outwards and are obtained by bending the end parts of the steel strip. In order to join together the clip-body ends 3, 4, which is usually done after the pipe (not shown) has been placed inside the pipe clip 1, in this example a threaded bolt 7 is provided. In this case, one clip-body end 3 is designed to accommodate the head of the threaded bolt 7 and the other clip-body end 4 is designed to accommodate the threaded shank of the threaded bolt 7.

Furthermore, a female fastening element 10 is arranged on the metal clip body 2, which female fastening element is used to attach the pipe clip 1 to a male fastening element which is provided with an external screw thread, which male fastening element forms the connection between the pipe clip 1, on the one hand, and the wall, ceiling or other support, on the other hand. A male fastening element of this kind usually has an M8 or M10 screw thread, but another screw thread or a thread-like ribbed profile is also possible.

A preferred embodiment of the female fastening element 10 will be explained below with reference to FIG. 2.

The female fastening element is composed of two parts, namely a housing 11 and a part 12 which forms an internal screw thread. The housing 11 is made from metal and has a peripheral wall 13 which extends from a top wall 14 and is provided, on the edge which is remote from the top wall 14, with an attachment flange 15. The peripheral wall 13 delimits a cavity 16 inside the housing 11, which cavity 16 is intended to accommodate the part 12 which forms the internal screw thread. Preferably, the housing 11 is produced by deep-drawing suitable metal sheet, in which case the housing 11 has a less angular shape than that which is shown in FIG. 2.

Preferably, the attachment flange 15, which may also be formed by a plurality of separate lips, projects outwards with respect to the peripheral wall 13. Preferably, the metal of the housing 11 is of a readily weldable grade, so that the attachment flange 15 of the housing 11 can be attached to the clip body 2 via a (spot-)welding operation.

In the top surface 14, i.e. on the side which is remote from the pipe-clip body 2, the housing 11 has an opening 17 which is sufficiently large for a male fastening element to fit through the opening 17 but not sufficiently large for the part 12 which forms the screw thread and is present inside the cavity 16 to be able to pass out of the cavity 16 via the opening 17. In a variant, the part 12 which forms the screw thread may be locked with respect to the housing 11 in another way. Furthermore, the housing 11 may be provided with openings in the peripheral wall 13.

On the outer side, the peripheral wall 13 forms a generally known hexagon with parallel spanner faces. Since the housing 2 is in this case made from sheet metal, the cavity 16 is also hexagonal.

The part 12 which forms the internal screw thread is made from a flat strip of spring steel which has been formed into a hexagonal shell (cf. FIG. 2), which shell encloses an axial bore 18 and fits into the hexagonal cavity 16 in the housing 11 and cannot move out of the said cavity when the housing 11 has been attached to the pipe-clip body 2.

In order to obtain the hexagonal shell, the strip of spring steel has six sections, here numbered 20–25, which, in the circumferential direction of the shell to be formed, each adjoin an adjacent section in each case via a bend line. A segment 30–35, respectively, which is delimited by a substantially U-shaped incision is formed in each of the sections 20–25, in which case each segment, via a foot which lies on the side of the top surface 14, adjoins the shell and is bent inwards about a bend line which lies in the region of the foot.

The free end of each segment 30–35, which is situated remote from the foot, forms an internal screw-thread part, the segments 30–35 being designed and disposed in such a way that together they form two threads of an internal screw thread which is matched to the external screw thread on the male fastening element or the like, to which the pipe clip 1 is attached.

Advantageously, the segments 30–35 are bent inwards in the region of their internal screw-thread part, so that the internal screw-thread parts are directed approximately at right angles to the insertion direction of the threaded rod. This is not shown in the drawing.

In order to form two threads, the segments 30–35 are alternately arranged at a long and short distance from that edge of the shell which adjoins the top surface 14 of the housing 11. In a variant which is not shown, the distance between the foot of each segment and the edge of the shell increases in a stepwise manner, so that the screw-thread parts of the segments come to lie in a single pitch of the threaded rod.

In particular, the internal screw-thread part of each segment 30–35 is formed by that part of the incision which lies opposite to the foot, which part defines a part of an arc of a circle which points towards the foot.

In the position shown in FIG. 1, the part 12 is therefore accommodated inside the housing 11 and is also locked against rotation with respect to the housing 11 by the complementary hexagonal cross-section.

The segments 30–35 can each move between a radially outer position, in which the male fastening element can be inserted into the female fastening element 10 in the direction of the clip body 2 without a screwing movement of the female fastening element 10, and therefore of the pipe clip 1, with respect to the male fastening element, and a radially inner position, in which the screw-thread parts are in engagement with the external screw thread on the male fastening element.

Each segment 30–35 is elastically deformable and, as a result, can move towards the radially outer position by inserting the male fastening element into the female fastening element 10 in the direction of the clip body 2. The segments 30–35 are designed in such a way that they remain in engagement with the male fastening element of their own accord under a load which seeks to move the male fastening element out of the female fastening element, and in particular the female fastening element 10 is sufficiently robust to withstand the usual safe load.

In a variant which is not shown, an inwardly projecting guide lip is also provided in each section 20–25, which guide lips together, in fact, delimit a hole for the male element, in such a manner that the lateral clearance of the male element is limited. These guide lips are situated at a distance from the hole 17, which in fact fulfils the same function, so that the possibility of the male fastening element tilting inside the female fastening element is also limited.

In order to attach this pipe clip 1 to the male fastening element, the pipe clip 1 can be held in one hand and the same hand can be used to press the pipe clip on the male fastening element, so that no additional tool is required. Once the pipe clip 1 has been attached to a male fastening element, it can only be unscrewed from the male fastening element by rotating the pipe clip 1 with respect to the male fastening element. For this reason, the housing 11 forms at least two parallel spanner faces.

Figure 2:
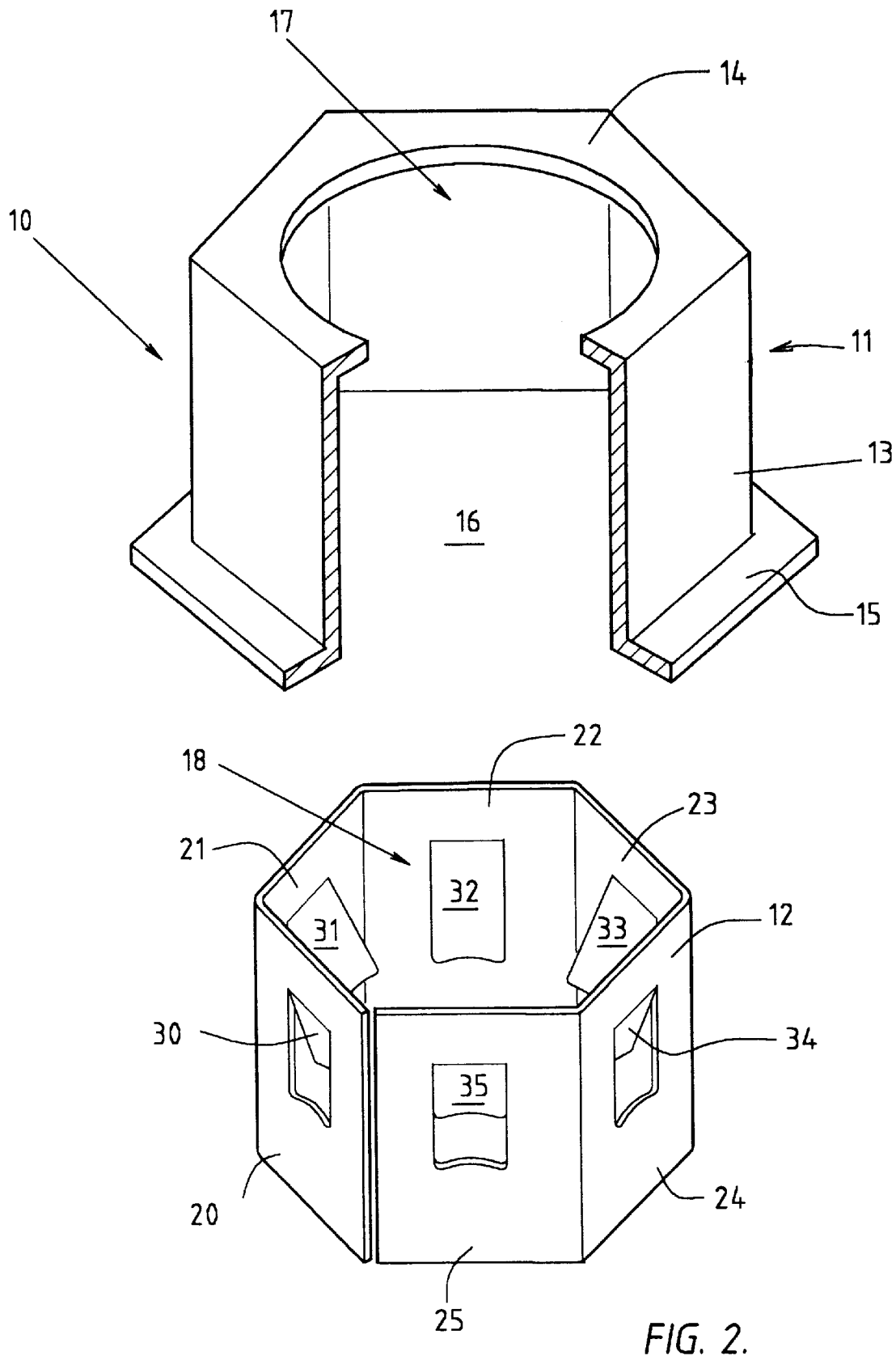
FIG. 2 shows the female fastening element of the pipe clip shown in FIG. 1 on a larger scale, partially cut away and in an exploded view.

The female fastening element 10 which is shown in FIG. 2 and described here is only one possible way of realizing the inventive idea. In a variant which is not shown of the female fastening element 10, there is provision for the housing 11 itself to be provided with resiliently flexible segments which face inwards, such as the segments 30–35, which form one or more threads of an internal screw thread. Therefore, in this variant the part 12 can be dispensed with. Furthermore, the shape of the fastening element 10 may also be different, for example cylindrical.

Figure 3:
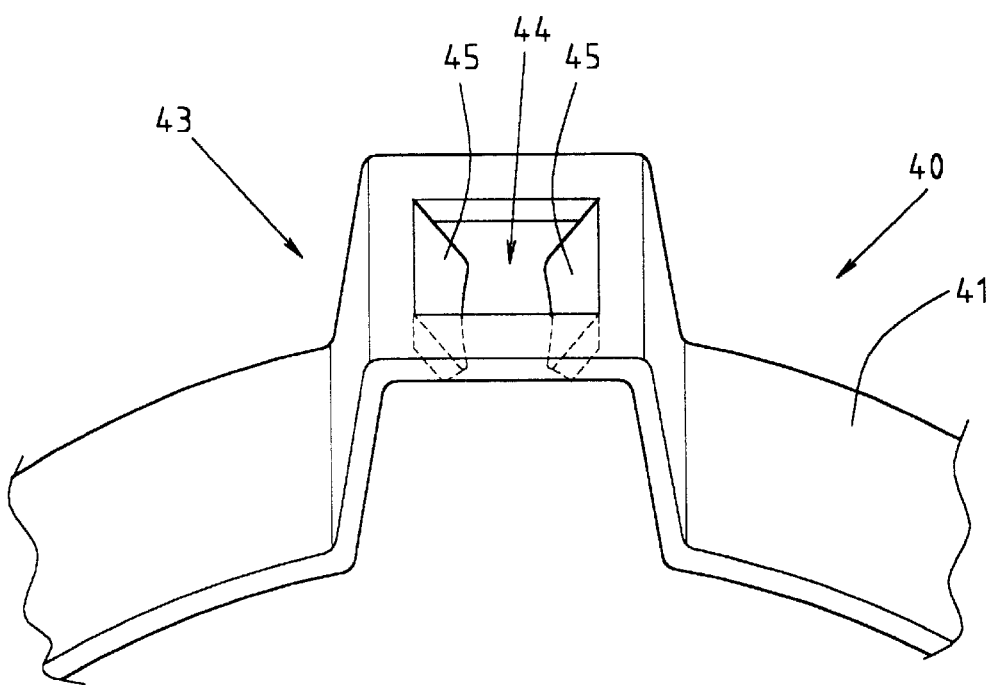
FIG. 3 shows a perspective view of a section of a second exemplary embodiment of the pipe clip according to the invention.

FIG. 3 shows that section of a second exemplary embodiment of the pipe clip according to the invention which relates to the female fastening element. This pipe clip 40 has a clip body 41 which is made from metal strip and is substantially annular, if appropriate composed of two clip-body halves, a section of the clip body 40 forming a protrusion 43 which faces outwards with respect to the annular shape, as a result of the metal strip being suitably deformed. The protrusion 43 is designed in such a way that it serves as a female fastening element, by means of which the pipe clip 40 can be placed on a male fastening element without having to be rotated.

An opening 44, which in this case is delimited by two mutually opposite and resilient segments 45, is formed in the protrusion 43. Each segment 45 adjoins the clip body 41 via a foot and is bent off towards the centre of the annular clip body 41. Furthermore, that free end of each segment 45 which is directed towards the other segment and is remote from its foot forms an internal screw-thread part. If appropriate, a plurality of segments may be provided. The pipe clip 41 described can easily be attached to a male fastening element, the segments 45 moving resiliently outwards in order to pass over the crests of the external screw thread or the like of the male fastening element. When the desired insertion has been reached, the segments engage between the crests of the screw thread of the male fastening element under spring loading. If the pipe clip 41 is subjected to a load which seeks to pull the male fastening element out of the opening 44, the free ends of the segments bear against the crests of the screw thread of the male fastening element and prevent the male fastening element from being pulled out.

Figure 4:
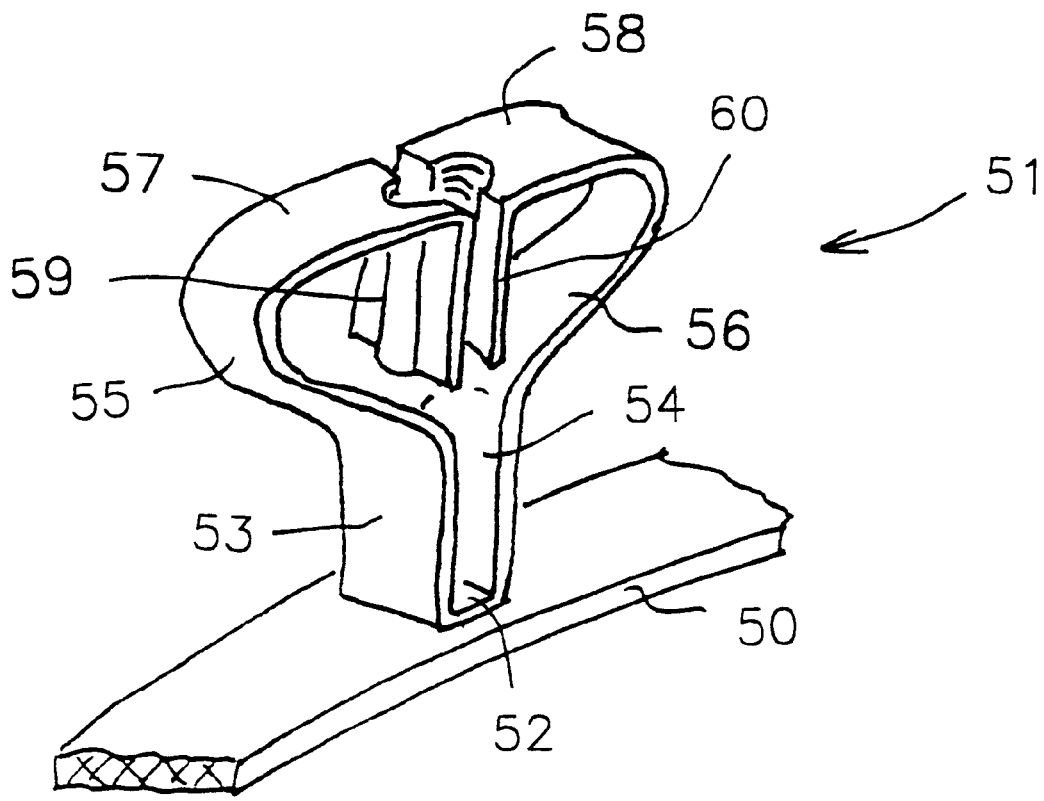
FIG. 4 shows a perspective view of a part of a third embodiment of the pipe clip according to the invention.

FIG. 4 shows a variant in which a female fastening element 51 is welded or riveted on a metal pipe clip body 50. The element 51 is bend from a metal strip having a base part 52 which is fitted to the pipe clip body 50 and on each side of the base part a leg 53, 54. The legs 53, 54 are substantially parallel at a distance of about the diameter of the male fastening element to be received. Each leg has an outwardly diverging part, 55 and 56 respectively, which adjoin the parts 57, 58 directed towards one another. The parts 57, 58 directed towards one another near each other closely and are provided with an internal screw thread part at that location, which is realized here by providing ends 59, 60 of the parts 57, 58, which ends are bend towards the pipe clip body, with a semi-circular screw threaded cutout. It will be apparent that a threaded rod or the like can be pressed between the threaded bend ends 59, 60 and then between the parallel legs 53, 54.

What is claimed is:

1. A pipe clip comprising an annular clip body which is made from metal and has at least one opening which is delimited by two adjacent clip-body ends, in order to position the clip body around a pipe, and joining means for joining together the clip-body ends when the pipe clip is lying around the pipe, said pipe clip furthermore comprising a female fastening element, which is fixed to the metal clip body and has an axial bore provided with an internal screw thread for a male fastening element which is provided with an external screw thread and can connect the pipe clip to a wall, ceiling or similar support, wherein said female fastening element comprises a plurality of moveable segments which are disposed around the axial bore of said female fastening element, each said moveable segment having at least one internal screw-thread part, said internal screw-thread parts together forming the internal screw thread of the female fastening element, each moveable segment being moveable between a radially outer position, in which said male fastening element can be inserted into the female fastening element in the direction of the clip body without a screwing movement of the female fastening element with respect to the male fastening element, and a radially inner position, in which said screw-thread parts can engage with the external screw thread of the male fastening element, wherein the moveable segments are arranged on a common segment support, and wherein each moveable segment is elastically deformable, so that the internal screw-thread part thereof can move radially outwards counter to an elastic deformation resistance of the segment.

2. A pipe clip according to claim 1, in which each moveable segment can move radially outwards by being acted on by the male fastening element which is inserted into the female fastening element in the direction of the clip body.

3. A pipe clip according to claim 1, in which said internal screw-thread parts are adapted to remain in engagement with the male fastening element of their own accord under a load which seeks to move the male fastening element out of the female fastening element.

4. A pipe clip according to claim 1, in which the moveable segments are made from spring steel.

5. A pipe clip according to claim 1, in which the internal screw-thread parts of the moveable segments of the female fastening element form a plurality of threads.

6. A pipe clip according to claim 1, in which the common segment support is accommodated in a corresponding housing, in which the housing is arranged fixedly on the clip body.

7. A pipe clip comprising an annular clip body which is made from metal and has at least one opening which is delimited by two adjacent clip-body ends, in order to position the clip body around a pipe, and joining means for joining together the clip-body ends when the pipe clip is lying around the pipe, said pipe clip furthermore comprising a female fastening element, which is fixed to the metal clip body and has an axial bore provided with an internal screw thread for a male fastening element which is provided with an external screw thread and can connect the pipe clip to a wall, ceiling or similar support, wherein said female fastening element comprises a plurality of moveable segments which are disposed around the axial bore of said female fastening element, each said moveable segment having at least one internal screw-thread part, said internal screw-thread parts together forming the internal screw thread of the female fastening element, each moveable segment being moveable between a radially outer position, in which said male fastening element can be inserted into the female fastening element in the direction of the clip body without a screwing movement of the female fastening element with respect to the male fastening element, and a radially inner position, in which said screw-thread parts can engage with the external screw thread of the male fastening element, wherein the moveable segments are accommodated in a corresponding housing, in which the housing is arranged fixedly on the clip body.

8. A pipe clip according to claim 7, in which the housing is welded on the clip body.

9. A pipe clip according to claim 7, wherein the housing is a metal housing.

10. A pipe clip according to claim 7, wherein the housing is a metal housing, and wherein the housing is produced by deep-drawing suitable metal sheet.

11. A pipe clip comprising an annular clip body which is made from metal and has at least one opening which is delimited by two adjacent clip-body ends, in order to position the clip body around a pipe, and joining means for joining together the clip-body ends when the pipe clip is lying around the pipe, said pipe clip furthermore comprising a female fastening element, which is fixed to the metal clip body and has an axial bore provided with an internal screw thread for a male fastening element which is provided with an external screw thread and can connect the pipe clip to a wall, ceiling or similar support, wherein said female fastening element comprises a plurality of moveable segments which are disposed around the axial bore of said female fastening element, each said moveable segment having at least one internal screw-thread part, said internal screw-thread parts together forming the internal screw thread of the female fastening element, each moveable segment being moveable between a radially outer position, in which said male fastening element can be inserted into the female fastening element in the direction of the clip body without a screwing movement of the female fastening element with respect to the male fastening element, and a radially inner position, in which said screw-thread parts can engage with the external screw thread of the male fastening element, wherein the moveable segments are arranged on a common segment support, and wherein the moveable segments and the segment support are formed integrally from a strip of metal, which is formed into a shell.

12. A pipe clip according to claim 11, wherein the strip has a plurality of sections which, in the circumferential direction of the shell to be formed, each adjoin an adjacent section via a bend line.

13. A pipe clip according to claim 11, wherein the strip has a plurality of sections which, in the circumferential direction of the shell to be formed, each adjoin an adjacent section via a bend line, and wherein at least one segment which is delimited by an incision is formed in each section, which segment, via a foot, adjoins the shell and is bent inwards about a bend line which lies in a region of the foot.

14. A pipe clip according to claim 11, wherein the strip has a plurality of sections which, in the circumferential direction of the shell to be formed, each adjoin an adjacent section via a bend line, and wherein at least one segment which is delimited by an incision is formed in each section, which segment, via a foot, adjoins the shell and is bent inwards about a bend line which lies in a region of the foot, and wherein the internal screw-thread part is formed by a part of the incision which lies opposite to the foot, and wherein the incision part defines a part of an arc of a circle which points towards the foot.

15. A pipe clip comprising an annular clip body which is made from metal and has at least one opening which is delimited by two adjacent clip-body ends, in order to position the clip body around a pipe, and joining means for joining together the clip-body ends when the pipe clip is lying around the pipe, said pipe clip furthermore comprising a female fastening element, which is fixed to the metal clip body and has an axial bore provided with an internal screw thread for a male fastening element which is provided with an external screw thread and can connect the pipe clip to a wall, ceiling or similar support, wherein said female fastening element comprises a plurality of moveable segments which are disposed around the axial bore of said female fastening element, each said moveable segment having at least one internal screw-thread part, said internal screw-thread parts together forming the internal screw thread of the female fastening element, each moveable segment being moveable between a radially outer position, in which said male fastening element can be inserted into the female fastening element in the direction of the clip body without a screwing movement of the female fastening element with respect to the male fastening element, and a radially inner position, in which said screw-thread parts can engage with the external screw thread of the male fastening element, wherein the moveable segments are accommodated in a corresponding housing, and wherein the housing is arranged fixedly on the clip body, and wherein the housing has parallel spanner faces on its outer side.

16. Pipe clip according to claim 15, wherein the housing has a peripheral wall forming a hexagon with parallel spanner faces.

17. Pipe clip according to claim 15, wherein the housing has a peripheral wall forming a hexagon with parallel spanner faces on the outside and a hexagonal cavity in the housing, and wherein said plurality of moveable segments are formed in a hexagonal shell of spring steel, said hexagonal shell having a cross-section complementary to the cross-section of the cavity, and wherein the hexagonal shell is fitted in said hexagonal cavity of the housing, so that the hexagonal shell is locked against rotation with respect to the housing.

18. A pipe clip comprising an annular clip body which is made from metal and has at least one opening which is delimited by two adjacent clip-body ends, in order to position the clip body around a pipe, and joining means for joining together the clip-body ends when the pipe clip is lying around the pipe, said pipe clip furthermore comprising a female fastening element, which is fixed to the metal clip body, said female fastening element having a base part which is fitted to the clip body and on each side of the base part a leg, said legs being substantially parallel at a distance corresponding to a diameter of a male fastening element to be pressed between the parallel legs, each parallel leg adjoining an outwardly diverging leg part, each said outwardly diverging leg part adjoining a further leg part, said further leg parts being directed towards one another and being provided with an internal screw thread part, said internal screw-thread parts together forming an internal screw thread for a male fastening element which is provided with an external screw thread and can connect the pipe clip to a wall, ceiling or similar support, wherein said male fastening element can be pressed between said screw thread parts and then between said parallel legs.

19. A pipe clip comprising an annular clip body which is made from metal and has at least one opening which is delimited by two adjacent clip-body ends, in order to position the clip body around a pipe, and joining means for joining together the clip-body ends when the pipe clip is lying around the pipe, said pipe clip furthermore comprising a female fastening element, which is fixed to the metal clip body and has an axial bore provided with an internal screw thread for a male fastening element which is provided with an external screw thread and can connect the pipe clip to a wall, ceiling or similar support, wherein said female fastening element comprises a plurality of moveable segments which are disposed around the axial bore of said female fastening element, each said moveable segment having at least one internal screw-thread part, said internal screw-thread parts together forming the internal screw thread of the female fastening element, each moveable segment being moveable between a radially outer position, in which said male fastening element can be inserted into the female fastening element in the direction of the clip body without a screwing movement of the female fastening element with respect to the male fastening element, and a radially inner position, in which said screw-thread parts can engage with the external screw thread of the male fastening element, wherein said female fastening element comprises a metal housing having a peripheral wall forming a hexagon with parallel spanner faces on the outside, and wherein said housing is fixedly arranged on the clip body, and wherein said moveable segments are resiliently flexible segments provided on said housing, said segments facing inwards and forming one or more threads of an internal screw thread.

* * * * *